US012762270B2

(12) United States Patent
Aoki

(10) Patent No.: US 12,762,270 B2
(45) Date of Patent: Oct. 13, 2026

(54) INFORMATION PROCESSING METHOD, SERVER APPARATUS, CLIENT APPARATUS, AND SYSTEM FOR CONTROLLING SENDING OF IMAGE FILE BEFORE AND AFTER SENDING AUTHENTICATION INFORMATION

(71) Applicant: CASIO COMPUTER CO., LTD., Tokyo (JP)

(72) Inventor: Nobuhiro Aoki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/543,393

(22) Filed: Dec. 18, 2023

(65) Prior Publication Data

US 2024/0211621 A1 Jun. 27, 2024

(30) Foreign Application Priority Data

Dec. 22, 2022 (JP) ................................ 2022-205569

(51) Int. Cl.
*G06F 21/62* (2013.01)
*G06F 16/955* (2019.01)
*G06F 21/31* (2013.01)
*G06T 7/00* (2017.01)

(52) U.S. Cl.
CPC ...... *G06F 21/6227* (2013.01); *G06F 16/9566* (2019.01); *G06F 21/31* (2013.01); *G06T 7/0012* (2013.01)

(58) Field of Classification Search
CPC .. G06F 16/9566; G06F 21/6227; G06F 21/31; G06T 7/0012; G06T 2200/24; G06T 2207/30088; H04L 63/083
See application file for complete search history.

(56) References Cited

U.S. PATENT DOCUMENTS

2003/0164852 A1* 9/2003 Simpson ................. G06F 16/40 707/E17.116
2013/0293694 A1* 11/2013 Mizobe .................. H04N 7/183 348/77
2020/0042685 A1* 2/2020 Tussy ..................... G06V 40/50 707/737
2021/0358596 A1* 11/2021 Boda .................. G06F 21/6209 348/77
2022/0343499 A1* 10/2022 Yousfi .................... G16H 30/40 348/77
2023/0050211 A1* 2/2023 Fukuda ................. H04L 63/083 707/734

FOREIGN PATENT DOCUMENTS

| | | | |
|---|---|---|---|
| JP | 2009020820 | A | 1/2009 |
| JP | 2013146414 | A | 8/2013 |
| JP | 2017033157 | A | 2/2017 |
| JP | 2017041256 | A | 2/2017 |
| JP | 2018125032 | A | 8/2018 |

* cited by examiner

*Primary Examiner* — Yuk Ting Choi
(74) *Attorney, Agent, or Firm* — Scully, Scott, Murphy & Presser, P.C.

(57) ABSTRACT

An information processing method for causing a computer to perform authentication processing by using authentication information in response to a request from a client apparatus for a Web application configured to provide an image analysis function, the request including the authentication information and information on an image file and predetermined processing in a case where the authentication processing is successful.

9 Claims, 14 Drawing Sheets

INFORMATION PROCESSING METHOD, SERVER APPARATUS, CLIENT APPARATUS, AND SYSTEM FOR CONTROLLING SENDING OF IMAGE FILE BEFORE AND AFTER SENDING AUTHENTICATION INFORMATION

CROSS-REFERENCE TO RELATED APPLICATION

This application claims priority to and benefit of Japanese Patent application No. 2022-205569 filed on Dec. 22, 2022. The entire specification, claims, and drawings of Japanese Patent application No. 2022-205569 are incorporated herein by reference.

TECHNICAL FIELD

The disclosure of the present specification relates to an information processing method, a server apparatus, a client apparatus, a system, a method implemented by a server apparatus, and a method implemented by a client apparatus.

BACKGROUND

Known is a Web application that performs image analysis processing on an image uploaded from a client apparatus to a server apparatus and provides a result to the client apparatus. Such a Web application is described in, for example, JP2013-146414A, JP2009-020820A, and the like.

SUMMARY

An information processing method according to one illustrative aspect of the present disclosure is for causing a computer to perform: authentication processing by using authentication information in response to a request from a client apparatus for a Web application configured to provide an image analysis function, the request including the authentication information and information on an image file; and predetermined processing in a case where the authentication processing is successful.

DETAILED DESCRIPTION

Figure 1:
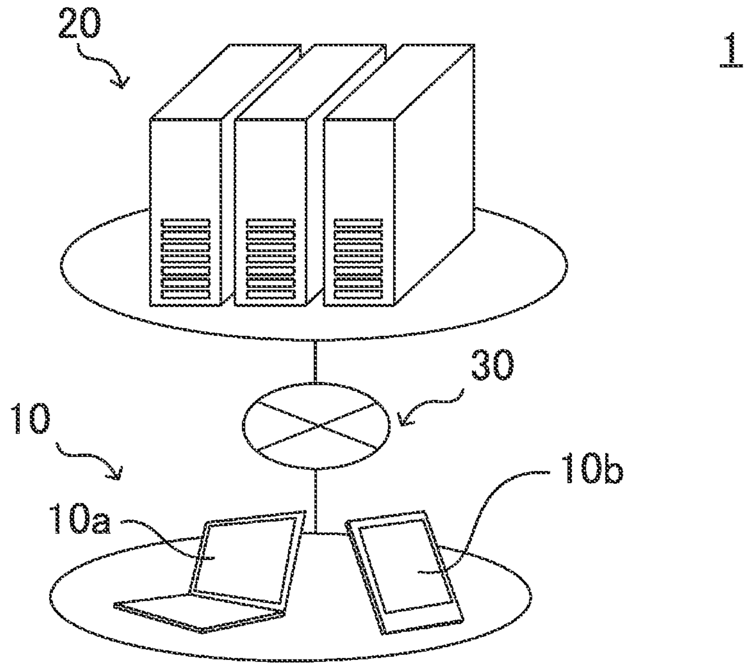
FIG. 1 is a view showing a configuration example of a system according to one illustrative embodiment.
Figure 2:
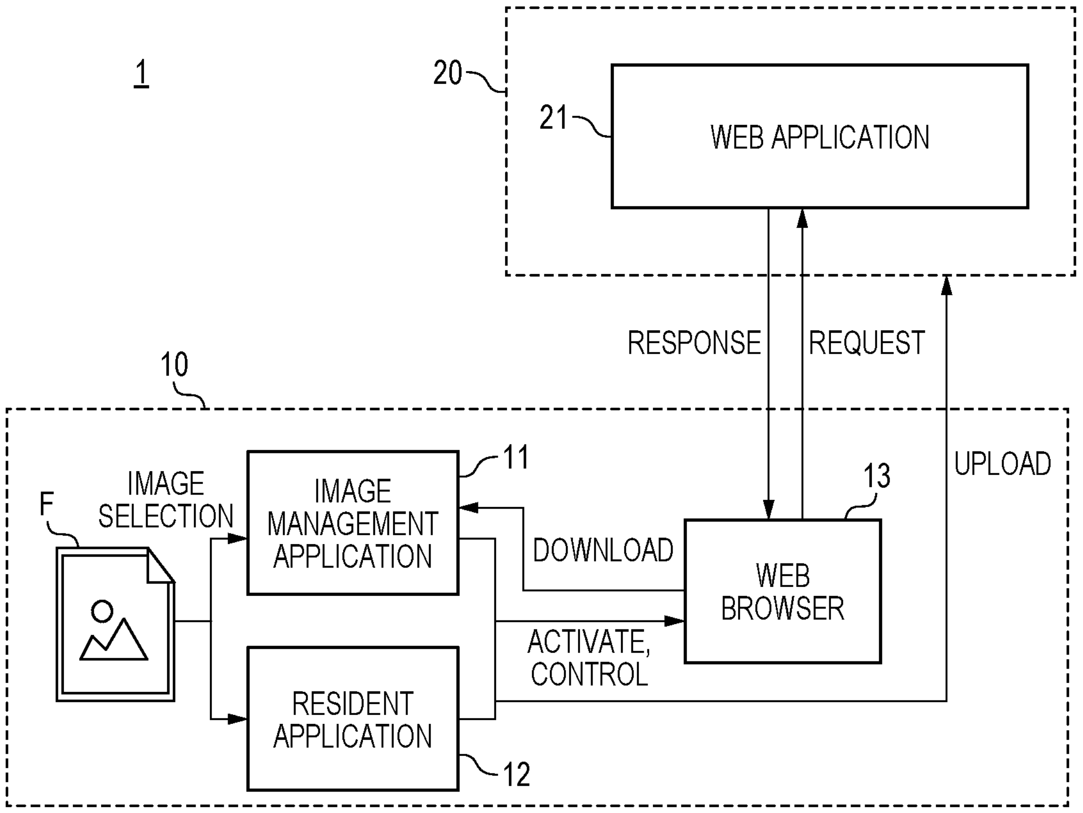
FIG. 2 is a view showing a configuration example of an application operating on the system according to one illustrative embodiment.

FIG. 1 is a view showing a configuration example of a system according to the present illustrative embodiment. FIG. 2 is a view showing a configuration example of an application operating on the system according to the present illustrative embodiment. The system 1 shown in FIGS. 1 and 2 is a Web application system that provides an image analysis function to a user. Hereinafter, the configuration of the system 1 will be described with reference and FIGS. 1 and 2.

As shown in FIG. 1, the system 1 includes one or more client apparatuses 10 (a client apparatus 10*a* and a client apparatus 10*b*) and a server apparatus 20, which are communicatively connected via a network 30. The network 30 is, for example, the Internet, but is not limited to the Internet, and the apparatuses may be connected through a dedicated line or the like.

As shown in FIG. 2, the server apparatus 20 is an apparatus on which a Web application 21 that provides an image analysis function operates. The Web application 21 provides an image analysis function to only a user who has successfully completed authentication processing.

In the Web application 21, processing of analyzing image data of an image file uploaded from the client apparatus 10, processing of causing an analysis result to be displayed on a Web browser 13 of the client apparatus 10, processing of outputting the analysis result to the client apparatus 10 as an image file, and the like are performed.

The client apparatus 10 is a terminal that is operated directly by a user, and, as shown in FIG. 2, accesses the Web application 21 operating on the server apparatus 20 by using the Web browser 13. At least the Web browser 13 is installed in the client apparatus 10. In addition, at least one of an image management application 11 and a resident application 12 is installed in the client apparatus 10.

The image management application 11 is an application that manages image files, and also operates as a viewer application for browsing an image file to be managed. In the client apparatus 10, as one of a plurality of functions provided by the image management application 11, a function for supporting access to the Web application 21, which will be described below, is provided. In the image management application 11, authentication information for logging in to the Web application 21 may be registered. The authentication information is, for example, a user ID and a password.

The image management application 11 classifies image files to be managed on the basis of metadata of the image files. For example, the image management application 11 may classify the image files on the basis of shooting date and time included in metadata of the image files, or classify the image files on the basis of identifiers for identifying photographic subjects included in the metadata of the image files. For example, the image management application 11 may cause image data of image files classified into a same group to be displayed as a list on a display unit of the client apparatus 10.

The resident application 12 is an application that provides a function for supporting access to the Web application 21, which will be described below. In the resident application 12 as well, similar to the image management application 11, authentication information for logging in to the Web application 21 may be registered.

By activating and controlling the Web browser 13 via any one of the image management application 11 and the resident application 12, the client apparatus 10 can notify an image file F saved in the client apparatus 10 and selected by the user to the Web application 21 as a target of image analysis, in response to a user's predetermined operation (for example, several click operations, and the like). This makes it possible to display an image confirmation page P5 (refer to FIG. 3), which will be described below, on the Web browser 13, and the user can further instruct image analysis on the image confirmation page P5 to cause the Web application 21 to analyze the image file F without performing a cumbersome operation. This will be described below in detail.

Figure 3:
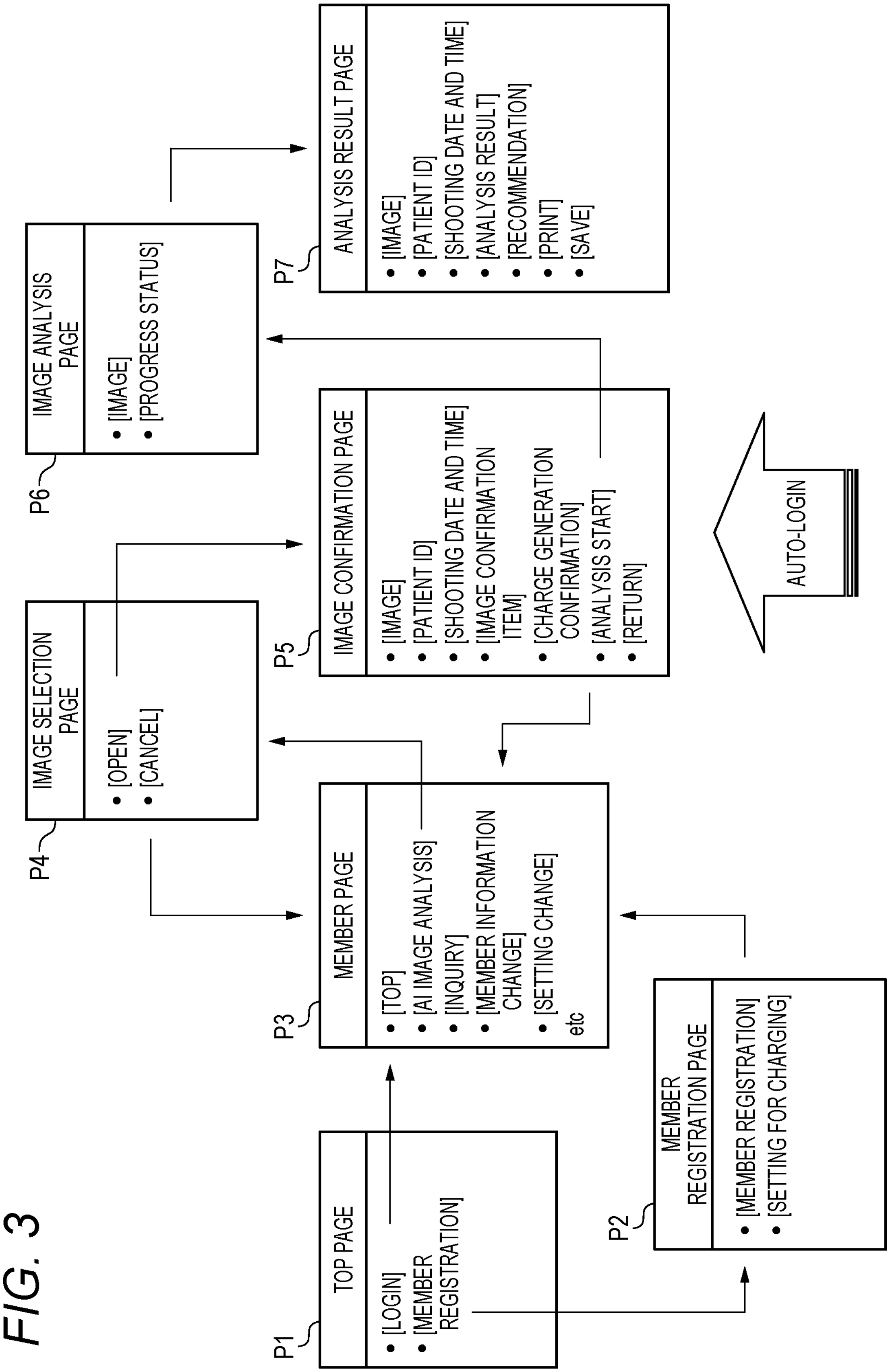
FIG. 3 is a view showing an example of a screen transition of a Web application operating on a server apparatus according to one illustrative embodiment.

FIG. 3 is a view showing an example of a screen transition of the Web application operating on the server apparatus 20 according to the present illustrative embodiment. As shown in FIG. 3, at least 7 pages are prepared in the Web application 21. Below, a role of each page of the Web application 21 will be described in brief.

Hereinafter, an example will be described in which the Web application 21 is an application for supporting a doctor's diagnosis of the presence or absence of skin diseases, and a doctor who is a user uploads an image file including data of a dermoscopy image obtainable from a dermoscope to the Web application 21.

Note that the dermoscope is a magnifying glass that can magnify and non-invasively observe a location suspected to be a lesion on the skin while reducing reflected light from the skin surface. For this reason, a dermoscopy image obtained by the dermoscope is suitable for identifying skin diseases. However, the image data to be input is not limited to image data of the dermoscopy image and image data of a medical image. In addition, the use of the Web application 21 is not limited to diagnostic support for a doctor.

A top page P1 includes an input form for inputting authentication information. When a user inputs authentication information into the input form and selects a "Login" button by a click operation, authentication processing is performed in the Web application 21. If authentication is successful, the screen transitions to a member page P3.

In addition, the top page P1 includes a link to a member registration page P2. When the user selects the link by a click operation, the screen transitions to the member registration page P2.

On the member registration page P2, member registration and a setting for charging associated with image analysis are performed. By performing the member registration and the like on the member registration page P2, the screen transitions to the member page P3. A user who visits a site of the Web application 21 for the first time performs member registration on the member registration page P2. Thereby, from the next time, by inputting the authentication information on the top page P1, the user can access the member page P3 without passing through the member registration page P2.

The member page P3 has various links (a link to the top page P1, a link to an inquiry page, a link to a member information change page, a link to a setting change page), as well as a link written as "AI image analysis." When the user selects "AI image analysis" by a click operation, the screen transitions to an image selection page P4.

On the image selection page P4, any image file on the client apparatus 10 can be selected. By selecting an image file including image data to be analyzed and selecting an "Open" button by a click operation, the screen transitions to an image confirmation page P5. On the other hand, by selecting a "Cancel" button through a click operation, the screen transitions to the member page P3 again. Note that the image selection page P4 may be replaced with a standard file selection dialogue.

The image confirmation page P5 includes a region for displaying information (image, patient ID, shooting date and time) of an image file selected on the image selection page P4, and a region for displaying various precautions for image analysis (image confirmation item, charge generation confirmation). Note that the patient ID and the shooting date and time are metadata included in the image file.

The image confirmation item is to urge a user to confirm, for example, whether an image is a dermoscopy image, whether a region suspected to be a lesion in the image occupies a certain proportion or more of an image region, and the like. The charge generation confirmation is to notify a user in advance that a use charge will be generated as a result of performing image analysis and the charge will be charged to the user.

When the user who has carefully confirmed the information on the image file and the precautions on the image confirmation page P5 selects an "Analysis Start" button by a click operation, image analysis is started, and the screen transitions to an image analysis page P6. Note that when a "Return" button is selected by a click operation, the screen transitions to the member page P3.

On the image analysis page P6, a progress status of the image analysis is displayed along with the information on the image file to be analyzed, and when the image analysis ends, the screen transitions to an analysis result page P7.

The analysis result page P7 includes a region for displaying the information on the image file (an image, a patient ID, a shooting date and time), and a region for displaying an analysis result, recommendation information, and the like.

The analysis result is, for example, information indicating a degree of certainty regarding the presence or absence of a disease determined by the analysis. The degree of certainty may be expressed quantitatively using a numerical value, a graph, or the like, or may be expressed qualitatively using a sentence, a picture, or the like. The recommendation information is information indicating whether it is required to recommend a medical institution that can make a more advanced or specialized diagnosis.

The information displayed on the analysis result page P7 can be output to a printing apparatus and printed by selecting a "Print" button provided on the analysis result page P7 through a click operation. In addition, the information displayed on the analysis result page P7 can be output to the client apparatus 10 and saved as an image file (also referred to as an analysis result file) by selecting a "Save" button provided on the analysis result page P7 through a click operation. Note that the information displayed on the analysis result page P7 may also be saved as a file of another format (for example, a PDF file) including image data, instead of the image file.

As described above, the Web application 21 described above can analyze the image data of the image file selected by the user, and provide a user with the analysis result in various formats such as a Web page (analysis result page P7), a printed product, and an electronic file represented by an image file. Therefore, by using the Web application 21, a doctor who is the user can obtain an objective advice on the presence or absence of a disease and make a final diagnosis by referring to the obtained information.

Figure 4:
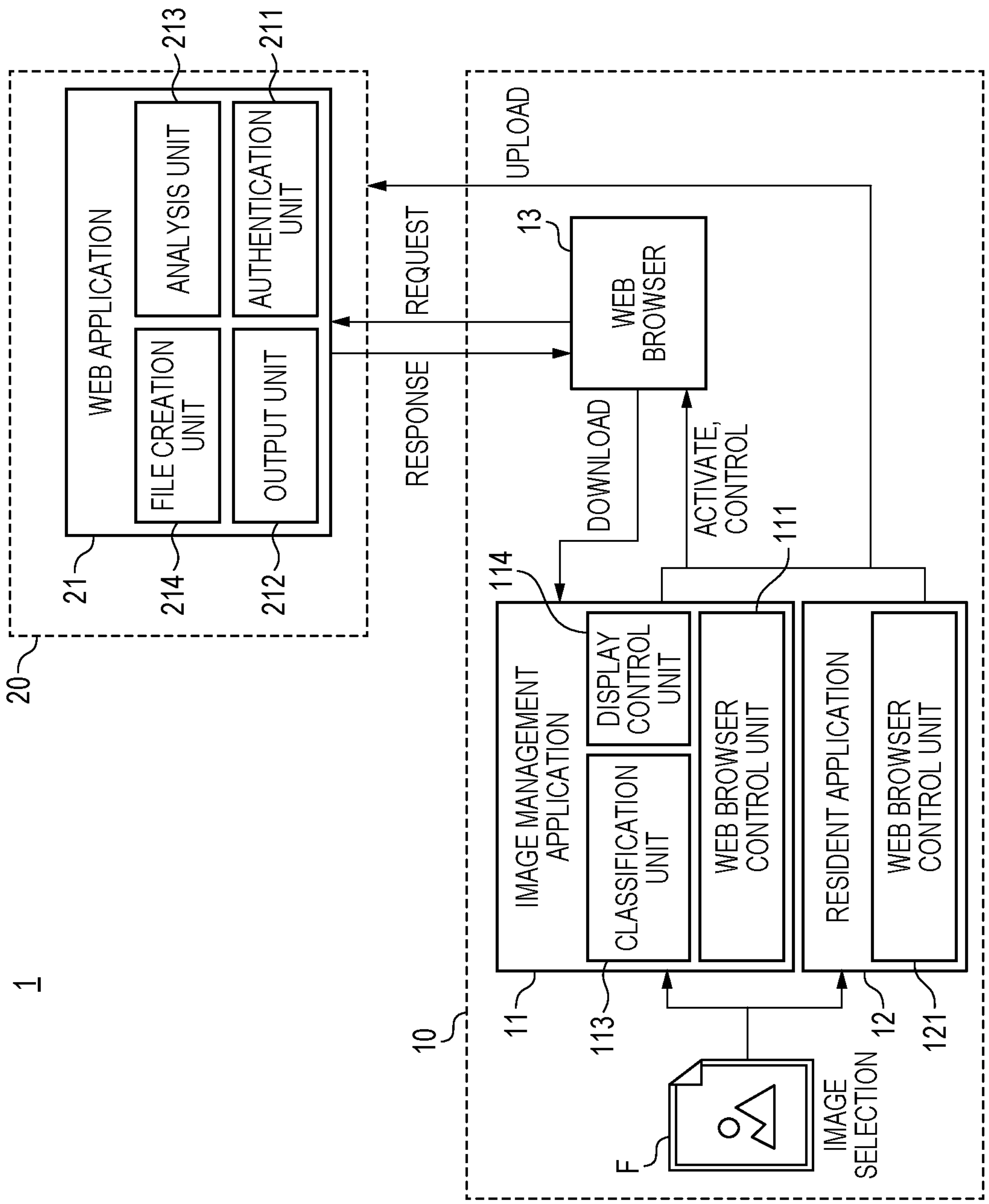
FIG. 4 is a view showing a functional configuration example of an application operating on the system according to one illustrative embodiment.

FIG. 4 is a view showing a functional configuration example of an application operating on the system 1 according to the present illustrative embodiment. Hereinafter, referring to FIG. 4, a structure will be described which improves access to the image analysis function of the Web application 21 implemented by the system 1 described above and allows a user to use the image analysis function without an effort. In addition, a structure will also be described which facilitates management of the image analysis result downloaded from the server apparatus 20.

The former structure is implemented by providing the client apparatus 10 with a Web browser control unit (a Web browser control unit 111, a Web browser control unit 121). In addition, the former structure is implemented by providing the server apparatus 20 with an authentication unit 211 and an output unit 212.

Additionally, the latter structure is implemented by providing the client apparatus 10 with a classification unit 113 and a display control unit 114. Additionally, the latter structure is implemented by providing the server apparatus 20 with an analysis unit 213, a file creation unit 214, and an output unit 212.

The Web browser control unit (a Web browser control unit 111, a Web browser control unit 121) is configured to implement a function of controlling the Web browser 13, and is implemented in the image management application 11 and the resident application 12 in the client apparatus 10. Specifically, as shown in FIG. 4, the image management application 11 has a Web browser control unit 111, and the resident application 12 has a Web browser control unit 121.

The Web browser control unit (the Web browser control unit 111, the Web browser control unit 121) activates the Web browser 13, in response to a user's predetermined operation performed in a state in which the image file F is selected, and causes the Web browser 13 to transmit a request for a URL (which is an abbreviation for Uniform Resource Locator) of the Web application 21 toward the server apparatus 20. The request includes authentication information saved in advance in the client apparatus 10 and information on the image file F.

The authentication information included in the request is, for example, information registered in advance in the image management application 11 or the resident application 12. In this case, the authentication information can be reliably transmitted to the server apparatus 20, regardless of the settings of the Web browser 13. In addition, the authentication information included in the request may be information registered in the Web browser 13 in association with the URL of the Web application 21. The authentication information registered in the Web browser 13 is, for example, authentication information that is used for an autocompletion function of the Web browser 13. The authentication information may be permanently stored or may be stored in a cookie for a limited period of time. In this case, the existing information that is used by the user can be efficiently utilized.

The authentication unit 211 and the output unit 212 are configured to implement a function of directly accessing the image confirmation page P5 by shortcutting the top page P1, the member page P3, and the image selection page P4, and are implemented in the Web application 21 in the server apparatus 20.

The authentication unit 211 processes the request transmitted to the server apparatus 20 by the Web browser control unit activating the Web browser 13. Specifically, the authentication unit 211 performs authentication processing by using the authentication information, in response to the request for the URL of the Web application 21 transmitted from the client apparatus 10 and including the authentication information and the information on the image file.

The URL of the request may be, for example, a URL of the top page P1 or a URL of the image confirmation page P5. In addition, if the URL of the request is a URL of the Web application 21, the URL may be a URL different from URLs from the top page P1 to the analysis result page P7.

When the authentication unit 211 receives a request for a predetermined URL including the authentication information and the information on the image file, the authentication unit performs authentication processing by using the authentication information included in the request.

The output unit 212 outputs a response, in response to an authentication result in the authentication unit 211, and causes the image data of the image file F to be displayed on the display unit of the client apparatus 10 as image data that is to be analyzed by the image analysis function of the Web application 21.

Specifically, when the authentication result is successful, the output unit 212 transmits a response including the image confirmation page P5 to the client apparatus 10. Note that if the URL of the request is different from that of the image confirmation page P5, the output unit 212 may redirect to the image confirmation page P5 and output a response. Thereby, the image confirmation page P5 displaying the information on the image file F is displayed on the Web browser 13.

In this way, in the system 1, when the user simply performs a predetermined operation in a state in which the image file F is selected on the client apparatus 10, the Web browser 13 is activated via the Web browser control unit and accesses the Web application 21. In addition, in the server apparatus 20, the login processing (authentication processing) is automatically performed, in response to the request from the Web browser 13, and a response including the image confirmation page P5 on which the image data of the image file F selected by the user is set as an analysis target is output. As a result, the image confirmation page P5 is displayed on the Web browser 13. Therefore, the user can use the image analysis function of the Web application 21 simply by confirming the image confirmation page P5 and inputting an analysis instruction.

The analysis unit 213 is configured to implement a function of analyzing image data in accordance with an analysis instruction from the user, and is implemented in the Web application 21 in the server apparatus 20.

The analysis unit 213 analyzes image data of an image file (hereinafter, referred to as a first image file) uploaded from the client apparatus 10 to the server apparatus 20. Specifically, the analysis unit 213 analyzes image data of an image displayed as an image analysis target on the image confirmation page P5, in response to an analysis instruction that is a user's predetermined operation (for example, selection by a click operation on the "Analysis Start" button on the image confirmation page P5 described above).

Note that a timing at which an image file including image data is uploaded from the client apparatus 10 to the server apparatus 20 is not particularly limited. The image file may be uploaded immediately before the analysis instruction is input and the image data is analyzed, or may be uploaded to the server apparatus 20 before the analysis instruction.

The analysis result page P7, which includes the analysis result analyzed by the analysis unit 213, is output to the client apparatus 10 by the output unit 212. For example, when the analysis processing ends, the output unit 212 transmits a response including the analysis result page P7 to the client apparatus 10.

The file creation unit 214 is configured to implement a function of creating a file suitable for management including the analysis result analyzed by the analysis unit 213, and is implemented in the Web application 21 in the server apparatus 20.

The file creation unit 214 creates a new image file (hereinafter, referred to as a second image file), which includes image data representing the analysis result analyzed by the analysis unit 213 and metadata including an identifier of a photographic subject included in metadata of the first image file.

Note that a timing at which the second image file is created is not particularly limited. The second image file may be created by the file creation unit 214 after the analysis processing is performed by the analysis unit 213, or the second image file may be created by the file creation unit 214, in response to a user's predetermined operation (for example, selection by a click operation on the "Save" button on the analysis result page P7 described above).

The output unit 212 not only outputs a response including the various pages described above, but also outputs the second image file to the client apparatus 10, in response to a request for download of the analysis result from the client apparatus 10. Specifically, the output unit 212 may output the second image file, for example, in response to a user's predetermined operation (for example, selection by a click operation on the "Save" button on the analysis result page P7 described above).

The classification unit 113 and the display control unit 114 are configured to implement a function of classifying and managing image files, and are implemented in the image management application 11 in the client apparatus 10.

The classification unit 113 classifies one or more first image files uploaded to the server apparatus 20 and one or more second image files downloaded from the server apparatus 20 by the identifier of the photographic subject included in the metadata of each image file.

The display control unit 114 causes image data of the one or more first image files and image data of the one or more second image files classified by the classification unit 113 to be displayed on the display unit of the client apparatus 10 for each identifier. Specifically, the display control unit 114 displays image data for each identifier in the display region of the image management application 11, which is a viewer application.

Note that the classification unit 113 may further classify image files that have not been uploaded to the server apparatus 20. In addition, the classification unit 113 may classify image files based on at least the identifier of the photographic subject, or may classify image files by using other metadata, in addition to or instead of the identifier of the photographic subject. Additionally, the display control unit 114 may cause image data to be displayed for each identifier, or may cause image data to be displayed for each other metadata.

In this way, in the system 1, the server apparatus 20 creates the second image file including the analysis result as image data so that the identifier of the photographic subject is included as metadata, and when the user requests download of the analysis result, outputs the second image file from the server apparatus 20 to the client apparatus 10. In the client apparatus 10, the image management application 11 manages the second image file downloaded from the server apparatus 20 by integrating the second image file with the first image file uploaded to the server apparatus 20. In particular, since the image files (image data) are classified by the image management application 11 on the basis of the identifier of the photographic subject taken over between image files before and after image analysis, the uploaded image file and the downloaded image file are automatically associated and managed. Therefore, by using the image management application 11, the user can associate and easily manage the downloaded image analysis result with the image data of the analysis source.

Figure 5:
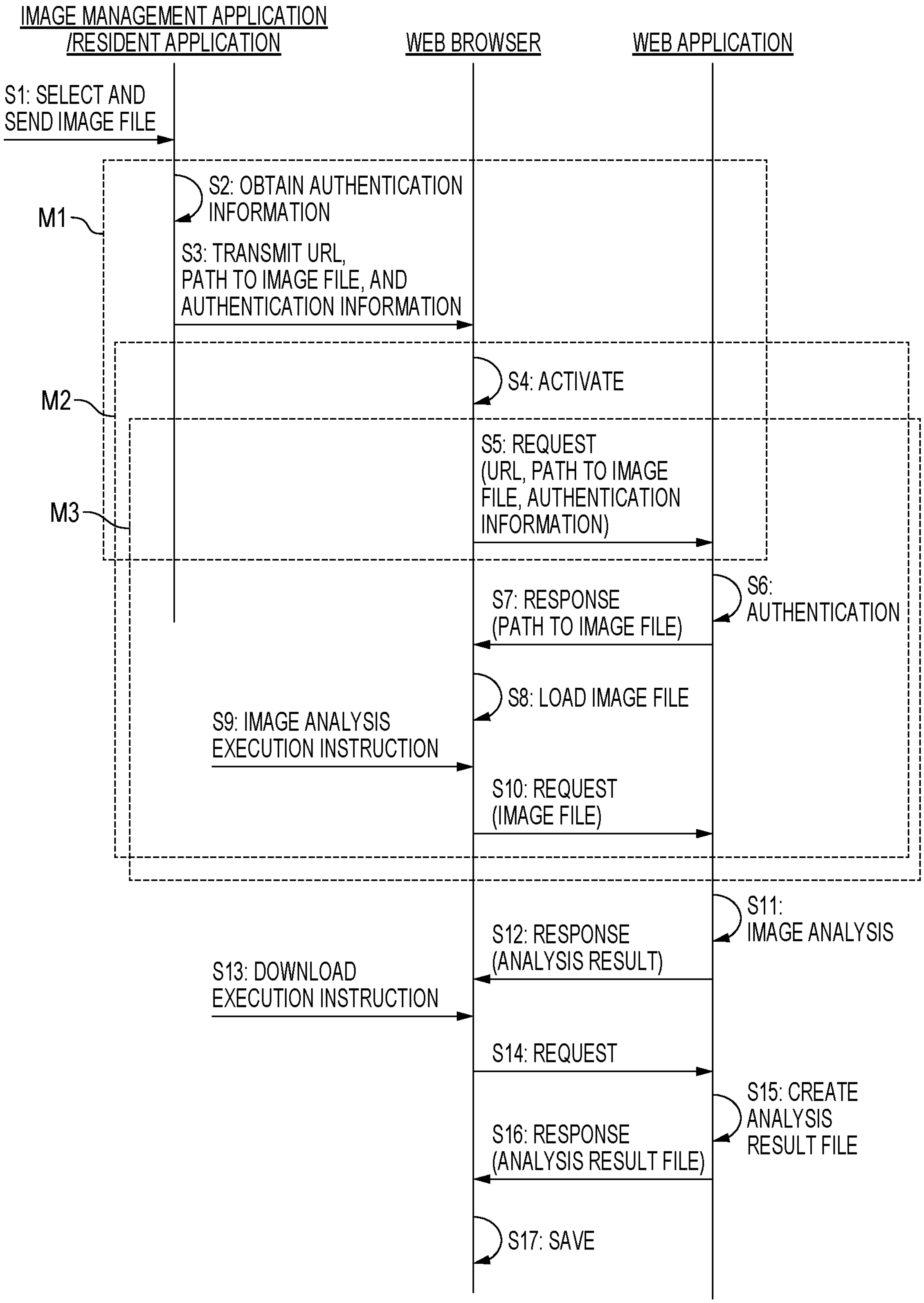
FIG. 5 shows an example of a sequence diagram showing exchange between applications operating on the system according to one illustrative embodiment.
Figure 6:
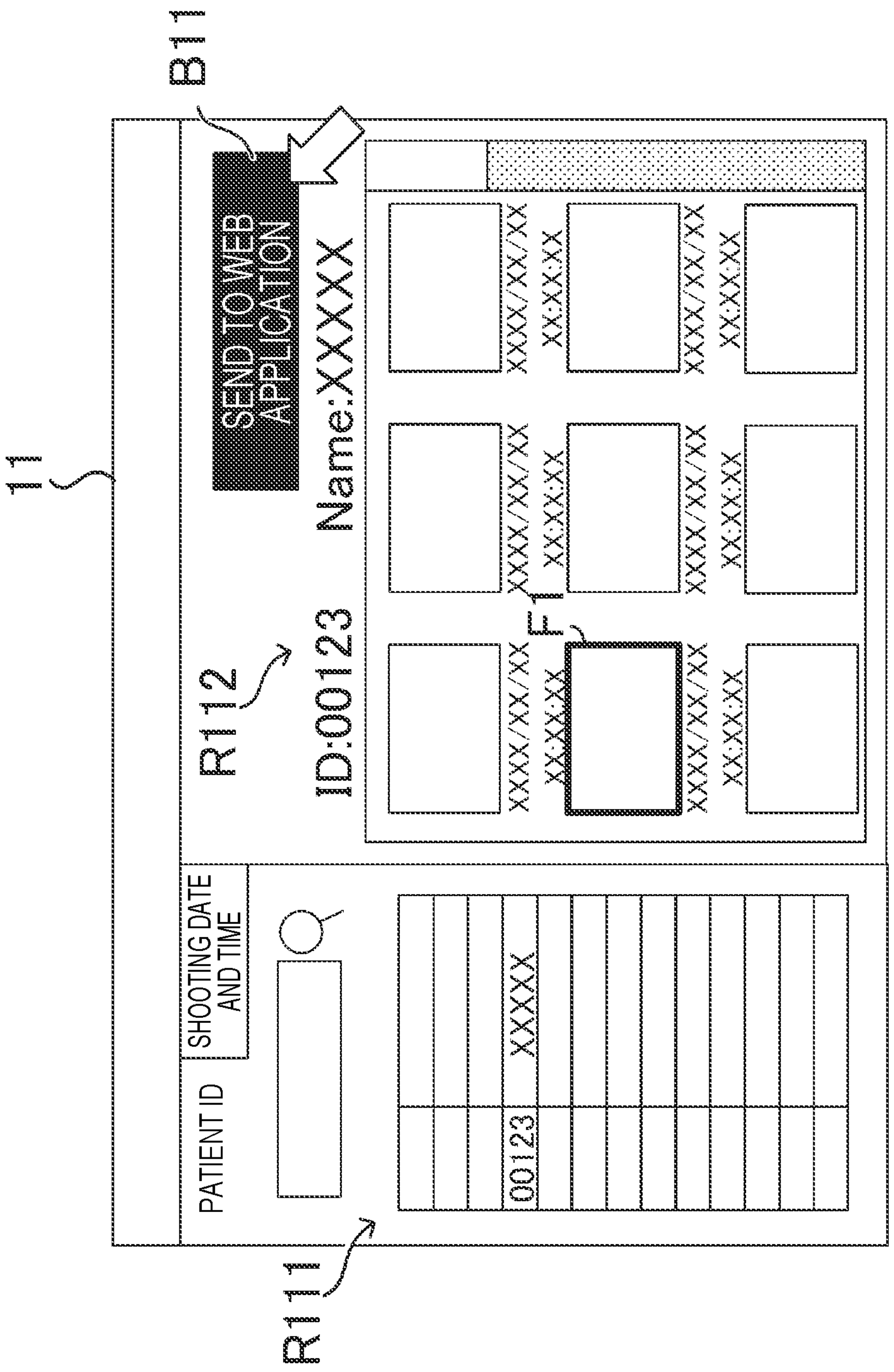
FIG. 6 is a view for illustrating a method for activating a Web browser via a viewer.
Figure 7:
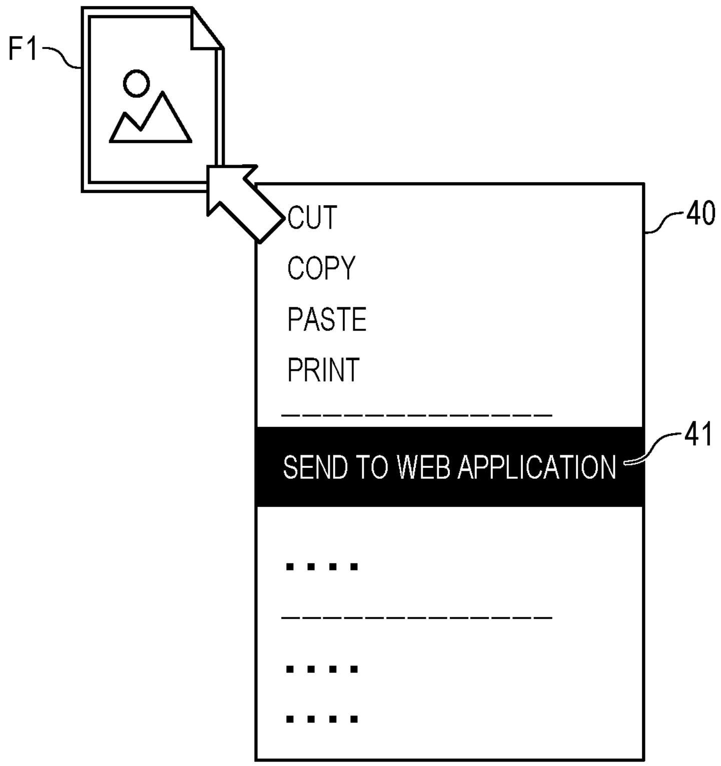
FIG. 7 is a view for illustrating a method for activating the Web browser via a resident application.
Figure 8:
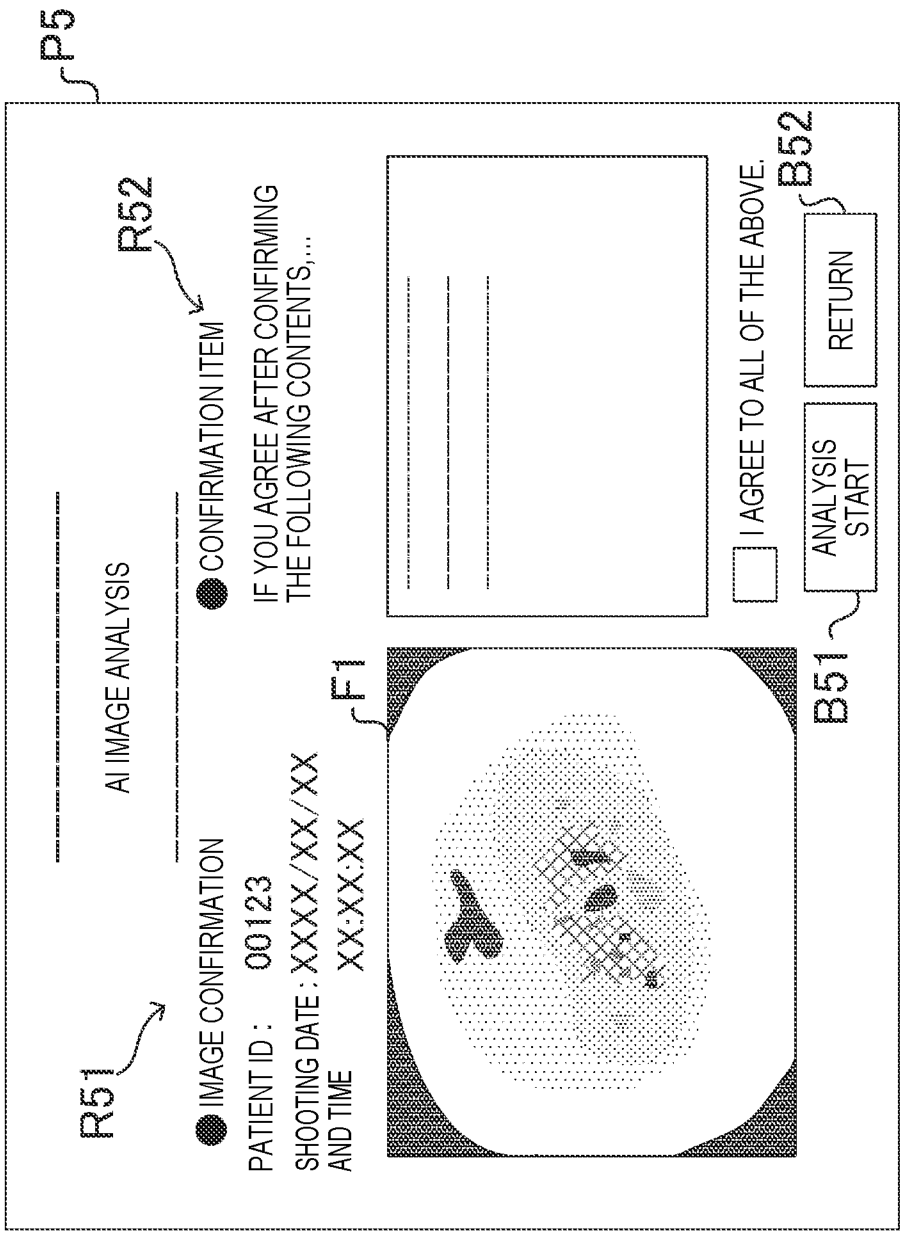
FIG. 8 is a view showing an example of an image confirmation page.
Figure 9:
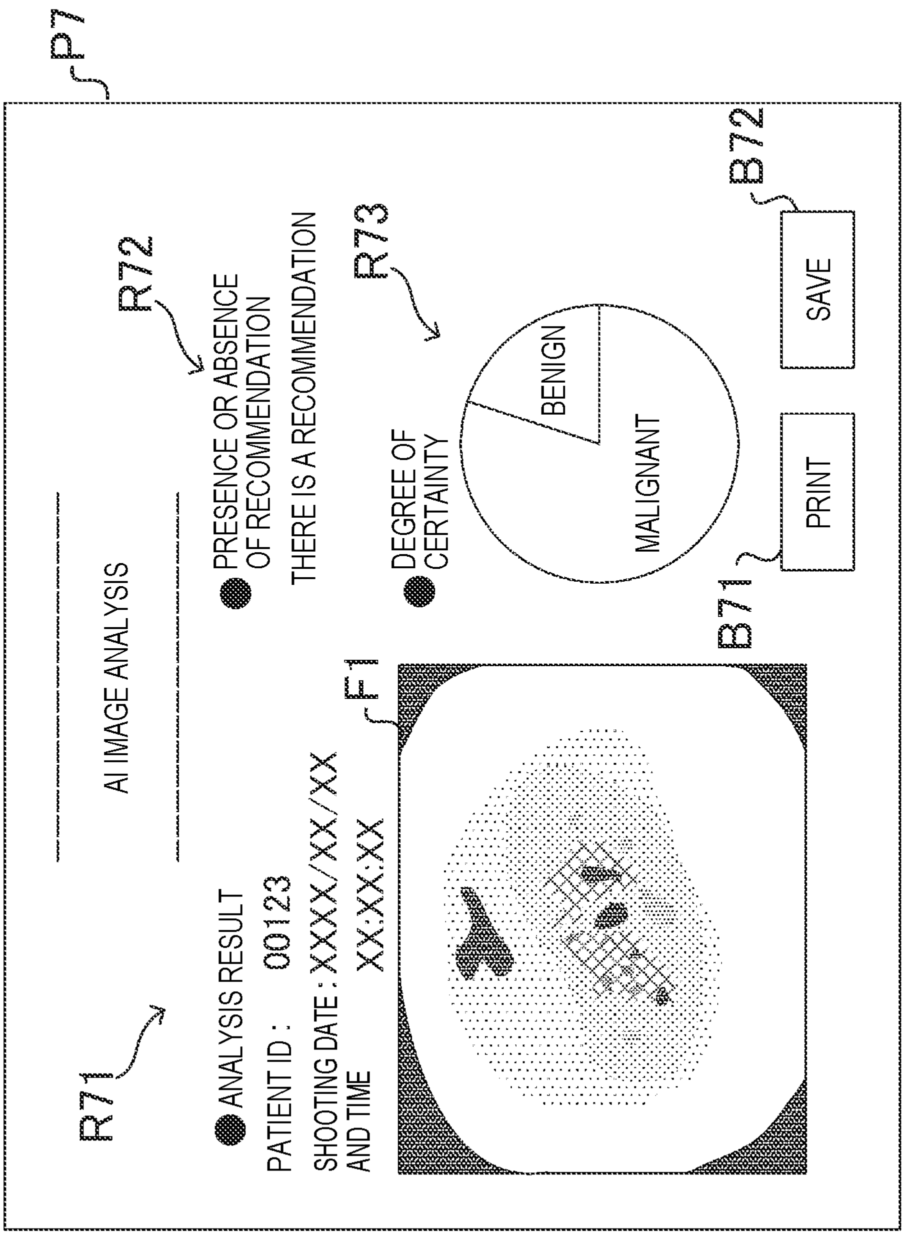
FIG. 9 is a view showing an example of an analysis result page.
Figure 10:
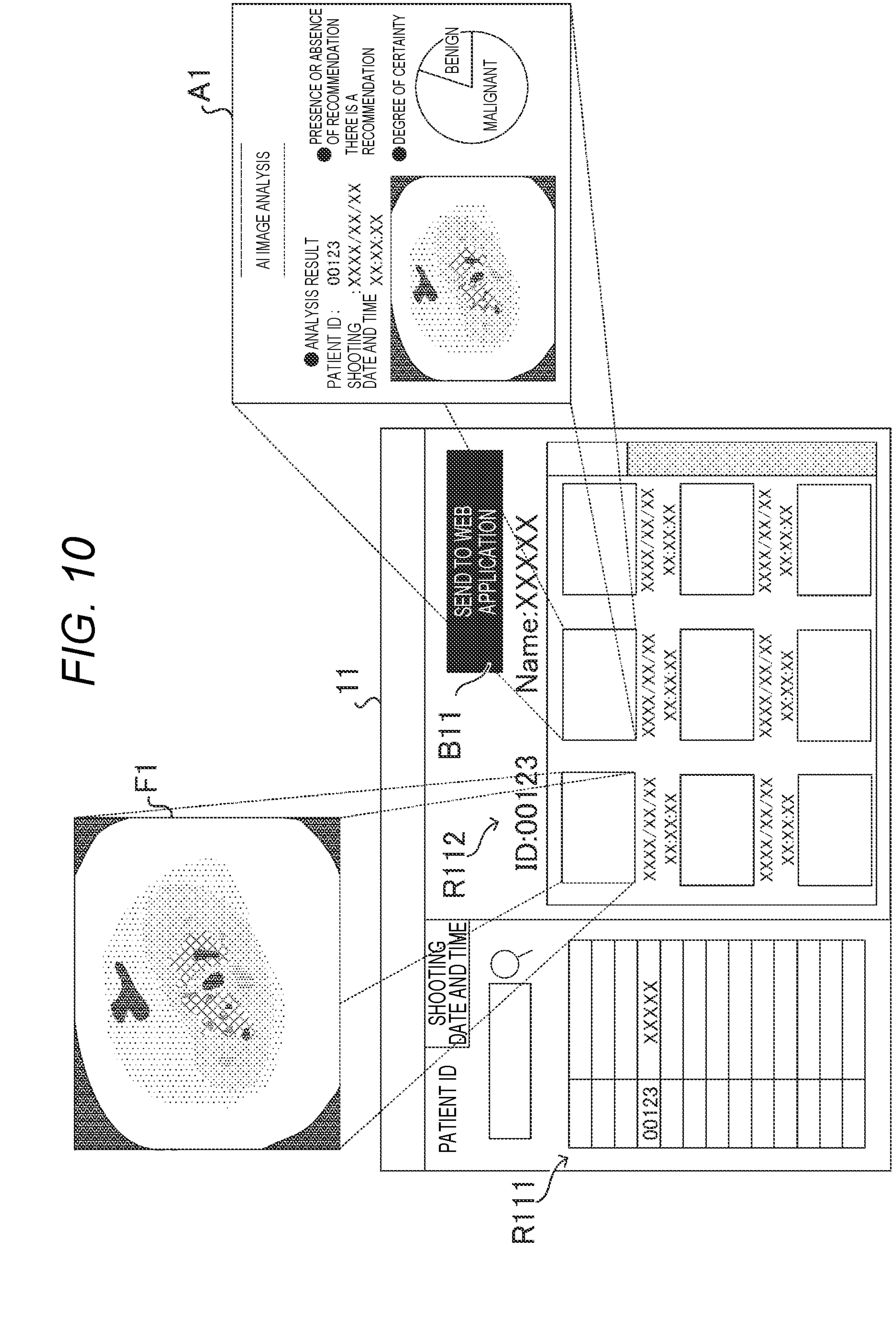
FIG. 10 shows a display example of an image file on the viewer.

FIG. 5 is an example of a sequence diagram showing exchange between applications operating on the system according to the present illustrative embodiment. FIG. 6 is a view for illustrating a method for activating a Web browser via a viewer. FIG. 7 is a view for illustrating a method for activating the Web browser via a resident application. FIG. 8 is a view showing an example of an image confirmation page. FIG. 9 is a view showing an example of an analysis result page. FIG. 10 shows a display example of an image file on the viewer. Below, a specific example of processing that is performed in the system 1 will be described with reference to FIGS. 5 to 10.

An example of processing in which an image file is uploaded from the client apparatus 10 to the server apparatus 20 and is analyzed in the server apparatus 20, and an analysis result is downloaded will be described.

First, the image management application 11 detects a user's operation for transmitting a selected image file to the Web application 21 (step S1). Here, the image management application 11 detects that a button B11 is selected by a click operation in a state in which the image file F1 is selected, as shown in FIG. 6, for example.

Note that in the image management application 11 shown in FIG. 6, a region R111 is a region for selecting metadata for narrowing down image files that are managed by the image management application 11. FIG. 6 shows an example of narrowing down the image files with the patient ID (here, "00123"), which is an identifier of the photographic subject included in the image file. In addition, a region R112 is a region for displaying a list of image data of image files corresponding to the metadata specified in the region R111. FIG. 6 shows an aspect in which a list of the image data of the image files having the metadata of the patient ID "00123" is displayed and the image file F1 is selected.

Next, the image management application 11 obtains the authentication information saved in the client apparatus 10 (step S2). Here, the image management application 11 obtains, for example, authentication information registered at the time of installation of the image management application 11 by reading the authentication information from a configuration file of the image management application 11.

Thereafter, the image management application 11 transmits a URL of the Web application 21, a path to the image file F1, and the authentication information to the Web browser 13 (step S3). The URL of the Web application 21 is a predetermined URL and is registered in the image management application 11. In addition, the path to the image file F1 is the information obtained at the time when the operation is detected in step S1. Additionally, the authentication information is the authentication information obtained in step S2.

Note that steps S1 to S3 may be performed in the resident application 12. In step S1, the resident application 12 may detect that a menu button 41 of "Send to Web application" is selected by a click operation from a context menu 40 displayed in the state in which the image file F1 is selected, as shown in FIG. 7.

Then, when the resident application 12 detects selection of the menu button 41 by a click operation, in step S2, the resident application may obtain the authentication information registered in the resident application 12, and in step S3, transmit the URL of the Web application 21, the path to the selected image file F1 and the authentication information obtained in step S2 to the Web browser 13.

The Web browser 13 is activated when data is transmitted from the image management application 11 or the resident application 12 (step S4). In addition, the Web browser 13 transmits, to the Web application 21, a request for the URL of the Web application 21, including the path to the image file F1 and authentication information received from the image management application 11 or the resident application 12 (step S5).

Note that a method for transmitting the request parameter (in this case, the path to the image file and the authentication information) in step S5 is not particularly limited. For example, the path to the image file and the authentication information may be sent to the Web application 21 as a query character string in the URL by using a GET method of HTTP (which is an abbreviation for Hypertext Transfer Protocol). In addition, by using a POST method of the HTTP, the path to the image file path and the authentication information may be embedded in a body of the request and sent to the Web application 21.

However, in general, when security is considered important, the data is preferably sent using the POST method. In particular, by using encrypted communication such as HTTPS (which is an abbreviation for Hypertext Transfer Protocol Secure) in the POST method, the risk of the path to the image file path and the authentication information being stolen or misused can be sufficiently suppressed.

The Web application 21 that has received the request performs authentication processing by using the authentication information included in the request (step S6), and then sends a response to the Web browser 13 (step S7). If the authentication processing is successful in step S6, the Web application 21 transmits a response including the image confirmation page P5 in step S7. The image confirmation page P5 transmitted from the Web application 21 to the Web browser 13 includes the path to the image file F1.

The Web browser 13 that has received the response loads the image file F1 from the path to the image file F1 included in the image confirmation page P5 (step S8). Thereby, the image data of the image file F1 is displayed in the image confirmation page P5 on the Web browser 13, as shown in FIG. 8. Therefore, as described below, upload of the image file F1 can be delayed to immediately before image analysis, and therefore, useless upload that may occur when image analysis is not performed can be avoided.

Note that in the image confirmation page P5 shown in FIG. 8, a region R51 is a region for displaying the information on the image file F1. FIG. 8 shows an aspect in which the patient ID ("00123") and information on the shooting date and time included in the image file F1 are displayed together with the image data of the image file F1 loaded from the client apparatus 10 in step S8. In addition, a region R52 is a region for displaying an item that the user should confirm in advance when analyzing an image. Note that the analysis start button (button B51) may be validated and subjected to a selectable state when a check is input to a checkbox provided in the region R52.

When the user who has confirmed the image confirmation page P5 selects the analysis start button (button B51) by a click operation, the Web browser 13 detects an analysis execution instruction (step S9) and transmits a request including the image file F1 to the Web application 21, as a request for execution of image analysis (step S10). That is, in step S10, the Web browser 13 uploads the image file F1 to the Web application 21, for example, by transmitting the image file with the POST method.

The Web application 21 that has received the request analyzes the image data of the image file F1 included in the request (step S11), and transmits a response including an analysis result to the Web browser 13 (step S12). Specifically, in step S12, the Web application 21 transmits a response including the analysis result page P7 shown in FIG. 9.

Note that in the analysis result page P7 shown in FIG. 9, a region R71 is a region for displaying the information on the image file F1. The region R71 is similar to the region R51 of the image confirmation page P5 shown in FIG. 8. In addition, a region R72 is a region for displaying recommendation information, and a region R73 is a region for displaying an analysis result. In this example, the region R73 indicates that there is a high probability that the lesion shown in an image is malignant, so the region R72 indicates a determination that it is necessary to recommend a medical institution for the patient.

When the user who has confirmed the analysis result page P7 selects a save button (button B72) by a click operation, the Web browser 13 transmits a request for download of the analysis result to the Web application 21 (step S14).

The Web application 21 that has received the request creates an analysis result file A1 (step S15), and transmits a response including the analysis result file A1 to the Web browser 13 (step S16). Note that the analysis result file A1 is an image file including, for example, a content of the analysis result page P7 as image data, and the metadata of the analysis result file A1 includes an identifier of a photographic subject included in the metadata of the image file F1.

The Web browser 13 saves the analysis result file A1 included in the response in the client apparatus 10 (step S17). Note that a location where the analysis result file A1 is saved is not particularly limited. The analysis result file can be saved in any folder designated by the user.

However, when the image management application 11 manages image files in a specific folder, the analysis result file is preferably saved in the folder. Thereby, the analysis result file A1 can be managed by the image management application 11 immediately after download.

As described above, in the system 1, when the user simply performs a predetermined operation in a state in which an image file is selected, as shown in FIGS. 6 and 7, the Web browser 13 can be caused to display the image confirmation page P5 of the Web application 21 shown in FIG. 8. For this reason, the user can use the image analysis function of the Web application 21 with fewer operations than the related art, and the user's operation until desired image data is analyzed and an analysis result file is downloaded to the client apparatus 10 can be simplified.

An example of processing of displaying an image file (analysis result file A1) downloaded from the server apparatus 20 to the client apparatus 10 and an image file F1 uploaded from the client apparatus 10 to the server apparatus 20 will be described.

When the user starts the image management application 11, a window of the image management application 11 shown in FIG. 10 is displayed. For example, when the image management application 11 is started, the image management application reads image files in a preset folder and displays a list of the patient ID and shooting date and time in the region R111 from the metadata of the image files. In the preset folder, for example, one or more first image files and one or more second image files are placed.

In addition, when a patient ID tab is selected in the region R111, the image management application 11 classifies and groups image files by the patient IDs included in the image files. Additionally, when a shooting date and time tab is selected in the region R111, the image management application 11 classifies and groups image files by the shooting date and time included in the image files.

In the region R112, image data of image files with specific metadata (patient ID, shooting date and time) selected in the region R111 is displayed as a list. For example, when the patient ID "00123" is selected in the region R111, the image management application 11 displays, as a list, image data of image files with the patient ID "00123" in the region R112, as shown in FIG. 10.

When the image file F1 with the patient ID "00123" is uploaded to the server apparatus 20, the image data is analyzed, and the analysis result file A1 is downloaded from the server apparatus 20, the image file F1 and the analysis result file A1 are integrated and displayed in the region R112 by the image management application 11, as shown in FIG. 10.

As described above, in the system 1, the analysis result file has at least part of the metadata included in the image file before analysis. For this reason, the client apparatus 10 can classify the analysis result file downloaded from the server apparatus 20, based on the metadata, and display the analysis result file according to the classification. In particular, since the analysis result file is automatically organized based on the metadata of the image data before analysis, the user can easily manage the downloaded image analysis result.

For example, the analysis result file is classified by an identifier of a photographic subject, such as the patient ID input at the time when taking an image with the dermoscope, so that a history of analysis results for the same patient can be displayed as a list, for example. For this reason, for example, the progress of each patient's disease, the outcome of treatment and the like can be easily confirmed.

In addition, in the system 1, the same metadata is taken over by the image files before and after analysis (image file F1, analysis result file A1), and is classified into the same group by the image management application 11. For this reason, various examinations can be easily performed by comparing image files before and after analysis. Additionally, since the image files before and after analysis are displayed in a pair, image data that has not been analyzed can also be easily identified.

The illustrative embodiment described above shows a specific example in order to easily understand the invention, and the present invention is not limited to the illustrative embodiment described above, and should be understood to include a variety of modifications and alternations of the illustrative embodiment described above. For example, it would be understood that the illustrative embodiment described above can be embodied by modifying the elements without departing from the gist and scope thereof. In addition, it would be understood that various illustrative embodiments can be implemented by appropriately combining the plurality of elements disclosed in the illustrative embodiment described above. Further, one skilled in the art would understand that various illustrative embodiments can be implemented by omitting some elements from all the elements shown in the illustrative embodiment or adding some elements to the elements shown in the illustrative embodiment. That is, the program, the server apparatus, the client apparatus, the system, the method that is implemented by the server apparatus, and the method that is implemented by the client apparatus can be diversely modified and changed without departing from the description of the claims.

Figure 11:
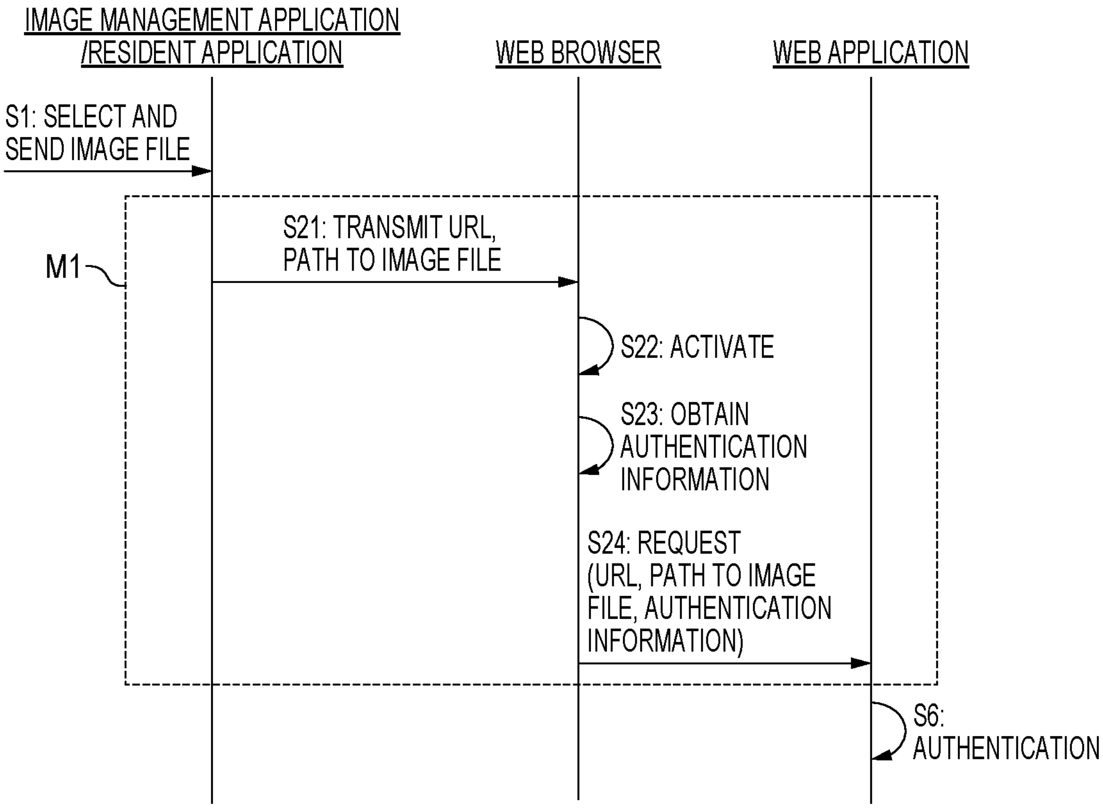
FIG. 11 shows a modified illustrative embodiment of a sequence diagram between applications operating on the system according to one illustrative embodiment.

FIG. 11 shows a modified illustrative embodiment of a sequence diagram between applications operating on the system according to the illustrative embodiment described above. For example, instead of the processing (steps S2 to S5) in a region M1 of the sequence diagram shown in FIG. 5, processing (steps S21 to S24) shown in FIG. 11 may be performed.

As shown in FIG. 11, instead of obtaining authentication information with the image management application 11 or the resident application 12, if the setting of the Web browser 13 allows the obtaining, after activating, the Web browser 13 may obtain authentication information by reading out the authentication information associated with the URL of the Web application 21 and registered in the Web browser 13.

Figure 12:
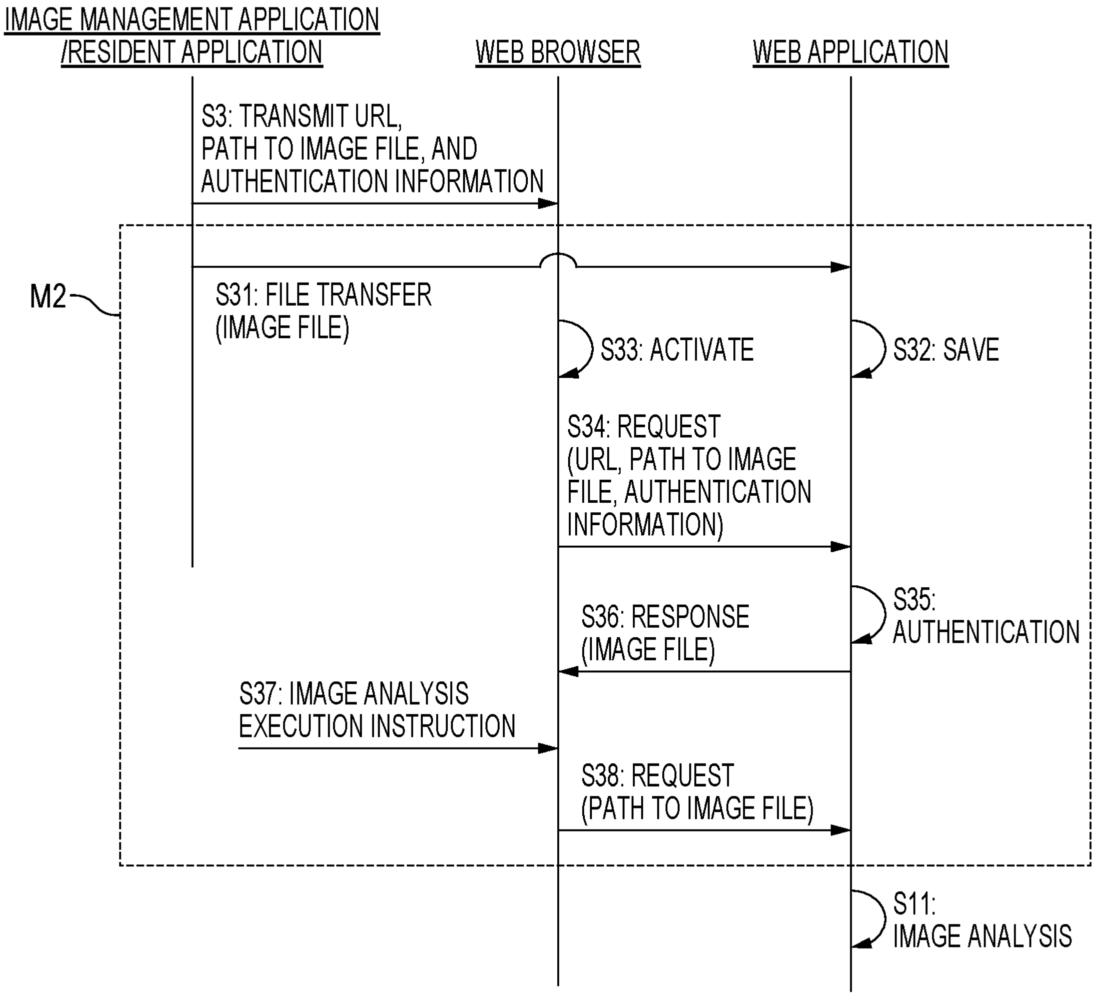
FIG. 12 shows another modified illustrative embodiment of the sequence diagram between applications operating on the system according to one illustrative embodiment.

FIG. 12 shows another modified illustrative embodiment of the sequence diagram between applications operating on the system according to the illustrative embodiment described above. For example, instead of the processing (steps S4 to S10) in a region M2 of the sequence diagram shown in FIG. 5, processing (steps S31 to S38) shown in FIG. 12 may be performed.

As shown in FIG. 12, instead of the Web browser 13 uploading an image file, the image management application 11 or the resident application 12 may upload an image file with any file transfer protocol before activating the Web browser 13. The risk of abuse can be lowered than when uploading an image file using the GET method of an HTTP request. Additionally, the image file may be uploaded before the image confirmation page P5 is displayed on the Web browser 13, and the image file uploaded before the image confirmation page P5 is displayed may be used for image analysis. In this case, the image file itself may be included in the response including the image confirmation page P5.

Thereby, even if the image data confirmed on the image confirmation page P5 has subsequently been edited on the client apparatus 10, it is possible to perform image analysis on the image data confirmed on the image confirmation page P5.

Figure 13:
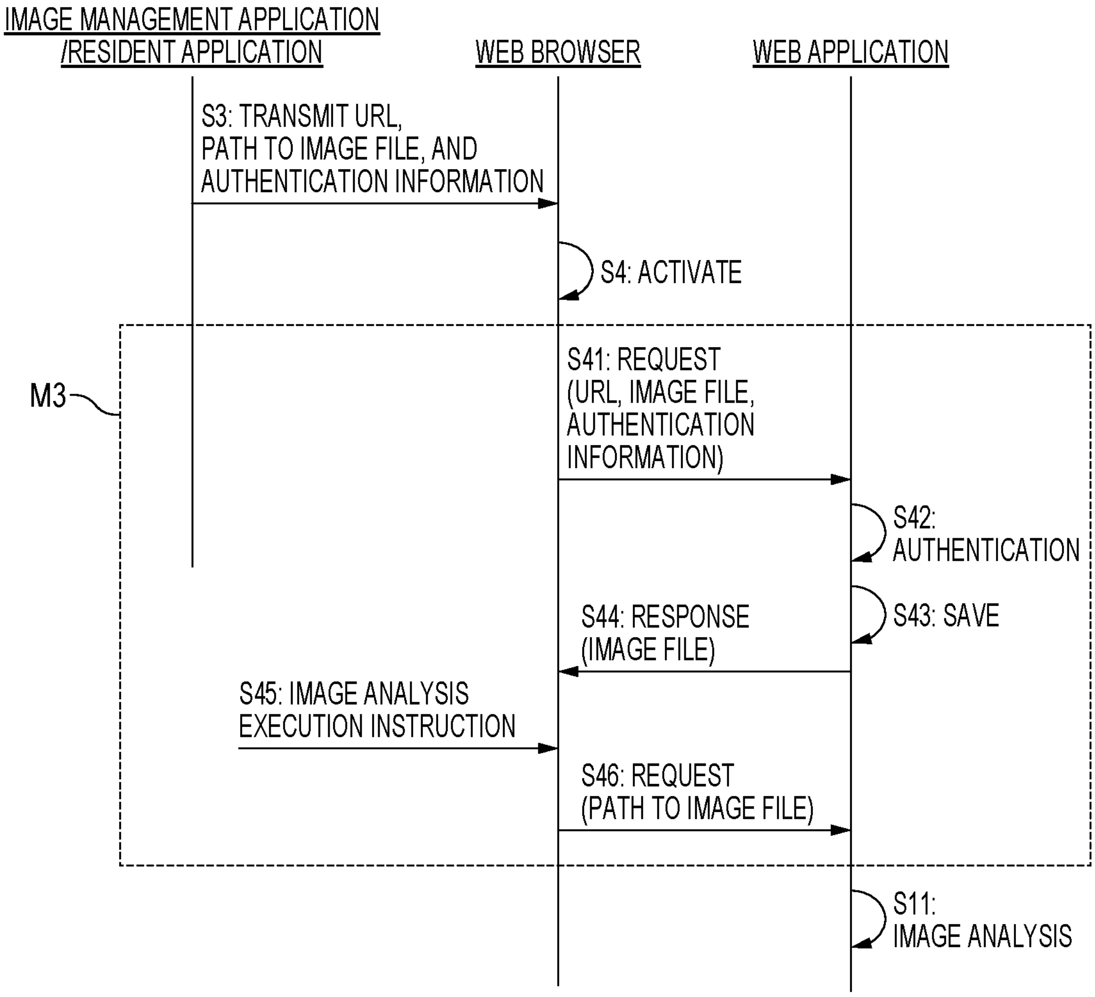
FIG. 13 shows still another modified illustrative embodiment of the sequence diagram between applications operating on the system according to one illustrative embodiment.

FIG. 13 shows still another modified illustrative embodiment of the sequence diagram between applications operating on the system according to the illustrative embodiment described above. For example, instead of the processing (steps S5 to S10) in a region M3 of the sequence diagram shown in FIG. 5, processing (steps S41 to S46) shown in FIG. 13 may be performed.

As shown in FIG. 13, instead of the Web browser 13 uploading an image file after the image analysis execution instruction is input, the Web browser 13 may upload the image file before the image analysis execution instruction is input. More specifically, when the user selects an image file on the image management application 11 and activates the Web browser 13 via the image management application 11, the Web browser 13 may upload the image file before displaying the image confirmation page P5.

In this case as well, similar to the case where the processing shown in FIG. 12 is performed, it is possible to securely perform the image analysis on the image data confirmed on the image confirmation page P5.

Figure 14:
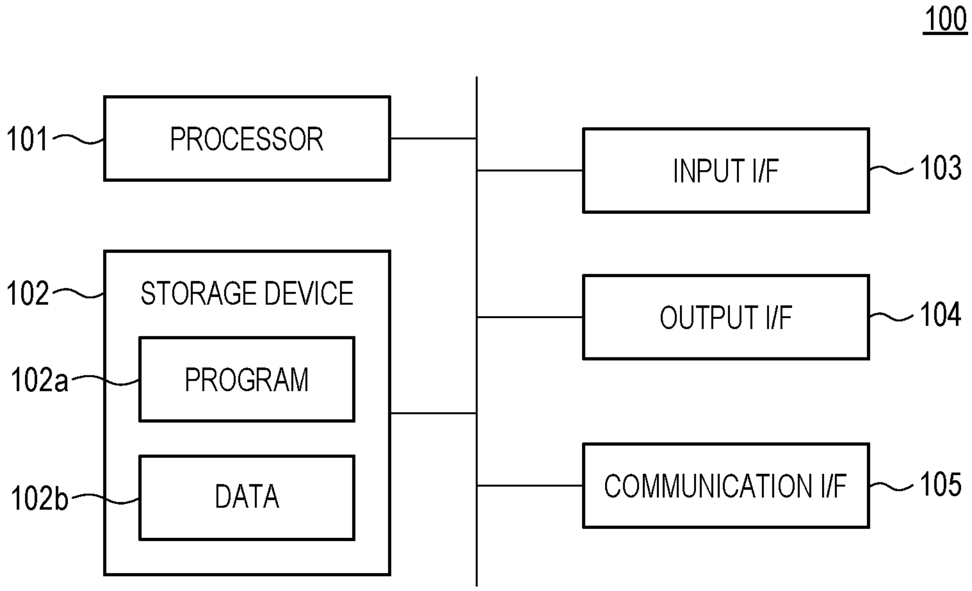
FIG. 14 is a block diagram illustrating an example of a hardware configuration of a computer according to one illustrative embodiment.

The hardware configurations of the client apparatus 10 and the server apparatus 20 are not particularly limited. The server apparatus 20 is shown as a single apparatus in FIG. 2, but may be configured by a plurality of apparatuses. The client apparatus 10 and the server apparatus 20 may be computers each provided with a processor and memory, and may have a configuration shown in FIG. 14, for example. The above-described functional configurations of the client apparatus 10 and the server apparatus 20 may be implemented by a processor 101 of a computer 100 shown in FIG. 14 executing a program 102*a* on a memory 102.

The processor 101 is not particularly limited, but may be, for example, a central processing unit (which is abbreviated as CPU), a graphics processing unit (which is abbreviated as GPU) or the like. In addition, the processor may include a hardware circuit such as a field-programmable gate array (which is abbreviated as FPGA) and an application specific integrated circuit (which is abbreviated as ASIC).

The memory 102 is not particularly limited, but may be a semiconductor memory such as a random access memory (which is abbreviated as RAM), a read only memory (which is abbreviated as ROM) and a solid state drive (which is abbreviated as SSD), a magnetic storage device such as a hard disk drive (which is abbreviated as HDD), or an optical memory device. The memory 102 stores a program 102*a* and various data 102*b* for executing the processing described above.

An input interface 103 is connected to a touch panel, a keyboard, and the like. In addition, the input interface 103 may also be connected to an audio input device such as a microphone. An output interface 104 is connected to a display device or the like. The display device may be a display device provided for the computer 100. A communication interface 105 exchanges data with the computer via, for example, the network 30.

In the illustrative embodiment described above, an operation of moving a pointer in the display screen to a predetermined position and clicking a mouse has been exemplified as the operation of selecting an image file, a button, or a link. However, the selection operation is not limited to a specific operation. When the client apparatus 10 has a touch panel display, the operation may be an operation of tapping the display screen.

What is claimed is:

1. An information processing method performed by a computer for performing a Web application, the information processing method comprising:

receiving, from a client apparatus via a network, a request parameter including authentication information including a login identification (ID) and password and image file information including a path to an image file to be analyzed stored in the client apparatus;

performing authentication processing by using the authentication information received;

in response to successfully performing the authentication processing, sending a response including an image confirmation page including the path to the image file, via the network, to the client apparatus, the response being effective to cause a Web browser of the client apparatus to load the image file based on the path to the image file included in the image confirmation page, to display image data of the image file in the image confirmation page, and to receive an input confirming selection of the image file, the input being effective to cause the client apparatus to send the image file via the network to the computer for performing the Web application; and performing, by the Web application and in response to the input received through the image confirmation page, predetermined analysis on the image file information received via the network.

2. An information processing method for causing a computer to perform:

activating a Web browser in response to a user's predetermined operation performed in a state in which an image file is selected;

causing the Web browser to transmit the request parameter including the authentication information stored in the client apparatus in advance via the network for the Web application executable by the information processing method according to claim 1 to the computer for performing the Web application on which the Web application runs, the request parameter causing the computer for performing the Web application to perform the authentication processing by using the authentication information to authenticate the user; and in response to receiving notification that the authentication processing was successfully performed, cause the Web browser to transmit the image file information, via the network, the image file information causing the computer for performing the Web application to perform the predetermined analysis on the image file information.

3. The information processing method according to claim 2, wherein the activating of the Web browser includes activating the Web browser by designating the authentication information, a URL of the Web application and the image file information on the image file.

4. The information processing method according to claim 2, wherein the information processing method causes the computer to further perform:

obtaining the authentication information based on a URL of the Web application from authentication information managed by the Web browser.

5. The information processing method according to claim 2, wherein the information processing method causes the computer to further perform:

uploading the image file to the computer for performing the Web application by using a file transfer protocol before activating the Web browser.

6. A server apparatus on which a Web application runs, the server apparatus comprising:

a processor; and a memory storing instructions which, when executed, cause the processor to perform operations comprising:

receiving, from a client apparatus via a network, a request parameter including authentication information including a login identification (ID) and password and image file information including a path to an image file to be analyzed stored in the client apparatus;

performing authentication processing by using the authentication information received;

in response to successfully performing the authentication processing, sending a response including an image confirmation page including the path to the image file, via the network, to the client apparatus, the response being effective to cause a Web browser of the client apparatus to load the image file based on the path to the image file included in the image confirmation page, to display image data of the image file in the image confirmation page, and to receive an input confirming selection of the image file, the input being effective to cause the client apparatus to send the image file via the network to the server apparatus for performing the Web application; and performing, by the Web application and in response to the input received through the image confirmation page, predetermined analysis on the image file information received via the network.

7. A client apparatus for accessing a Web application running on a server apparatus to provide an image analysis function the client apparatus comprising:

a control device configured to:

activate a Web browser of the client apparatus in response to a user's predetermined operation performed in a state in which an image file is selected;

cause the Web browser to transmit, via a network and to the server apparatus, a request parameter including authentication information including a login identification (ID) and password and image file information including a path to an image file to be analyzed stored in the client apparatus; the request parameter causing the server apparatus to perform authentication processing by using the authentication information;

receive, via the network and from the server apparatus, a response including an image confirmation page including the path to the image file;

in response to receiving the response, cause the Web browser to load the image file based on the path to the image file included in the image confirmation page, to display image data of the image file in the image confirmation page;

receive an input confirming selection of the image file; and in response to receiving input, cause the Web browser to transmit, via the network and to the server apparatus, the image file information effective to cause the server apparatus to perform predetermined analysis on the image file information.

8. A system comprising:

the server apparatus according to claim 6.

9. A system comprising:

the client apparatus according to claim 7.

* * * * *